(12) United States Patent
Stieber

(10) Patent No.: US 11,092,384 B2
(45) Date of Patent: Aug. 17, 2021

(54) THERMAL STRESS RELIEF FOR HEAT SINKS

(71) Applicant: Hamilton Sundstrand Corporation, Windsor Locks, CT (US)

(72) Inventor: Jesse Joseph Stieber, Avon, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 66 days.

(21) Appl. No.: 14/996,043

(22) Filed: Jan. 14, 2016

(65) Prior Publication Data
US 2017/0205157 A1 Jul. 20, 2017

(51) Int. Cl.
| | |
|---|---|
| *F28D 7/06* | (2006.01) |
| *B33Y 10/00* | (2015.01) |
| *F28F 9/02* | (2006.01) |
| *F28D 1/02* | (2006.01) |
| *F28D 1/047* | (2006.01) |
| *F28F 9/013* | (2006.01) |

(52) U.S. Cl.
CPC .............. *F28D 7/06* (2013.01); *B33Y 10/00* (2014.12); *F28F 9/0243* (2013.01); *F28F 9/0246* (2013.01); *F28D 1/0233* (2013.01); *F28D 1/0475* (2013.01); *F28F 9/0131* (2013.01); *F28F 9/0273* (2013.01); *F28F 2009/0285* (2013.01); *F28F 2250/106* (2013.01); *F28F 2270/00* (2013.01)

(58) Field of Classification Search
CPC ....................................................... F28D 7/06
USPC ........................................................ 165/176
See application file for complete search history.

(56) References Cited

U.S. PATENT DOCUMENTS

| 2,752,128 A | 6/1956 | Dedo |
| 3,193,002 A | 7/1965 | Ritz et al. |
| 3,734,176 A * | 5/1973 | Hagnauer ................ F28D 7/06 165/143 |
| 4,800,955 A * | 1/1989 | Hagemeister ............ F28D 7/06 165/163 |

(Continued)

FOREIGN PATENT DOCUMENTS

| DE | 1189572 B | 3/1965 |
| FR | 1092683 A | 4/1955 |

(Continued)

OTHER PUBLICATIONS

European Search, European Search Report or the partial European Search Report/Declaration of no search, and the European Search Opinion for International Patent Application No. 16198734.2, dated Feb. 2, 2017, 8 pages.

*Primary Examiner* — Hung Q Nguyen
*Assistant Examiner* — Mark L. Greene
(74) *Attorney, Agent, or Firm* — Cantor Colburn LLP

(57) ABSTRACT

A crossflow heat exchanger includes an outer housing, an inlet that receives a hot fluid to be cooled and a monolithic manifold includes a central receiving reservoir and one or more outer reservoirs. The fluid received at the inlet passing into the central receiving reservoir. The exchanger also includes an outlet connected to the one or more outer reservoirs and tubes disposed within the outer housing that connect the central receiving reservoir and the one or more outer reservoirs. The monolithic manifold includes a gap formed between the central receiving reservoir and one or more outer reservoirs.

4 Claims, 5 Drawing Sheets

(56) References Cited

U.S. PATENT DOCUMENTS

| | | | | |
|---|---|---|---|---|
| 4,809,774 | A * | 3/1989 | Hagemeister | F28D 7/08 |
| | | | | 165/163 |
| 4,893,674 | A * | 1/1990 | Hagemeister | F28D 7/06 |
| | | | | 165/176 |
| 4,913,226 | A * | 4/1990 | Hagemeister | F28D 7/06 |
| | | | | 165/163 |
| 4,940,084 | A * | 7/1990 | Grieb | F28D 7/06 |
| | | | | 165/176 |
| 4,986,344 | A * | 1/1991 | Maier | F28F 9/013 |
| | | | | 165/144 |
| 5,479,985 | A * | 1/1996 | Yamamoto | F28D 1/05391 |
| | | | | 165/153 |
| 5,758,718 | A | 6/1998 | De Lazzer | |
| 6,918,598 | B2 * | 7/2005 | Wilcox | F01D 11/005 |
| | | | | 165/134.1 |
| 8,726,976 | B2 * | 5/2014 | Schrader | F28D 1/0426 |
| | | | | 165/140 |
| 2004/0003916 | A1 | 1/2004 | Nash | |
| 2013/0105130 | A1 * | 5/2013 | Watanabe | F28D 1/05391 |
| | | | | 165/173 |
| 2015/0052893 | A1 | 2/2015 | Geskes | |
| 2017/0044980 | A1 * | 2/2017 | Duesler | F02C 7/18 |
| 2017/0044983 | A1 * | 2/2017 | Duesler | F02C 7/185 |

FOREIGN PATENT DOCUMENTS

| | | |
|---|---|---|
| GB | 1580597 A | 12/1980 |
| JP | S56121817 A | 9/1981 |

* cited by examiner

US 11,092,384 B2

THERMAL STRESS RELIEF FOR HEAT SINKS

STATEMENT OF FEDERAL SUPPORT

This invention was made with government support with Air Force Contract No. FA8650-09-D-2923. The government therefore has certain rights in this invention.

BACKGROUND OF THE INVENTION

Exemplary embodiments of this invention generally relate to heat exchangers and, more particularly, to methods of manufacturing a heat exchanger.

Heat exchangers (also referred to as heat sinks) are devices built for transferring heat from one fluid to another. Heat exchangers are commonly used in refrigeration, air conditioning, space heating, electricity generation, and chemical processing. Heat exchangers are of particular use in the aerospace and automobile industries.

The fluids may be direct contact or separated by a solid wall or other divider that keeps them from mixing. For efficiency, heat exchangers that do not allow mixing are designed to maximize the surface area of the wall between the two fluids, while minimizing resistance to fluid flow through the heat exchanger

BRIEF DESCRIPTION OF THE INVENTION

According to one embodiment of the invention, a cross-flow heat exchanger is disclosed. The exchanger includes an outer housing and an inlet that receives a hot fluid to be cooled. The heat exchanger also includes a monolithic manifold including a central receiving reservoir and one or more outer reservoirs. Fluid received at the inlet passes into the central receiving reservoir and an outlet connected to the one or more outer reservoirs. The exchanger also includes tubes disposed within the outer housing that connect the central receiving reservoir and the one or more outer reservoir. The monolithic manifold includes a gap formed between the central receiving reservoir and one or more outer reservoirs.

Also disclosed is a method of forming a heat exchanger. The method includes: forming an outer housing; forming an inlet that receives a hot fluid to be cooled; forming a monolithic manifold including a central receiving reservoir and one or more outer reservoirs, the fluid received at the inlet passing into the central receiving reservoir; forming an outlet connected to the one or more outer reservoirs; and disposing tubes within the outer housing that connect the central receiving reservoir and the one or more outer reservoirs. In this embodiment, forming the monolithic manifold includes forming a gap between the central receiving reservoir and one or more outer reservoirs.

Also disclosed is a monolithic manifold for use in a heat exchanger. The manifold includes a central receiving reservoir and one or more outer reservoirs, the fluid received at the inlet passing into the central receiving reservoir. The monolithic manifold includes a gap between the central receiving reservoir and one or more outer reservoirs.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
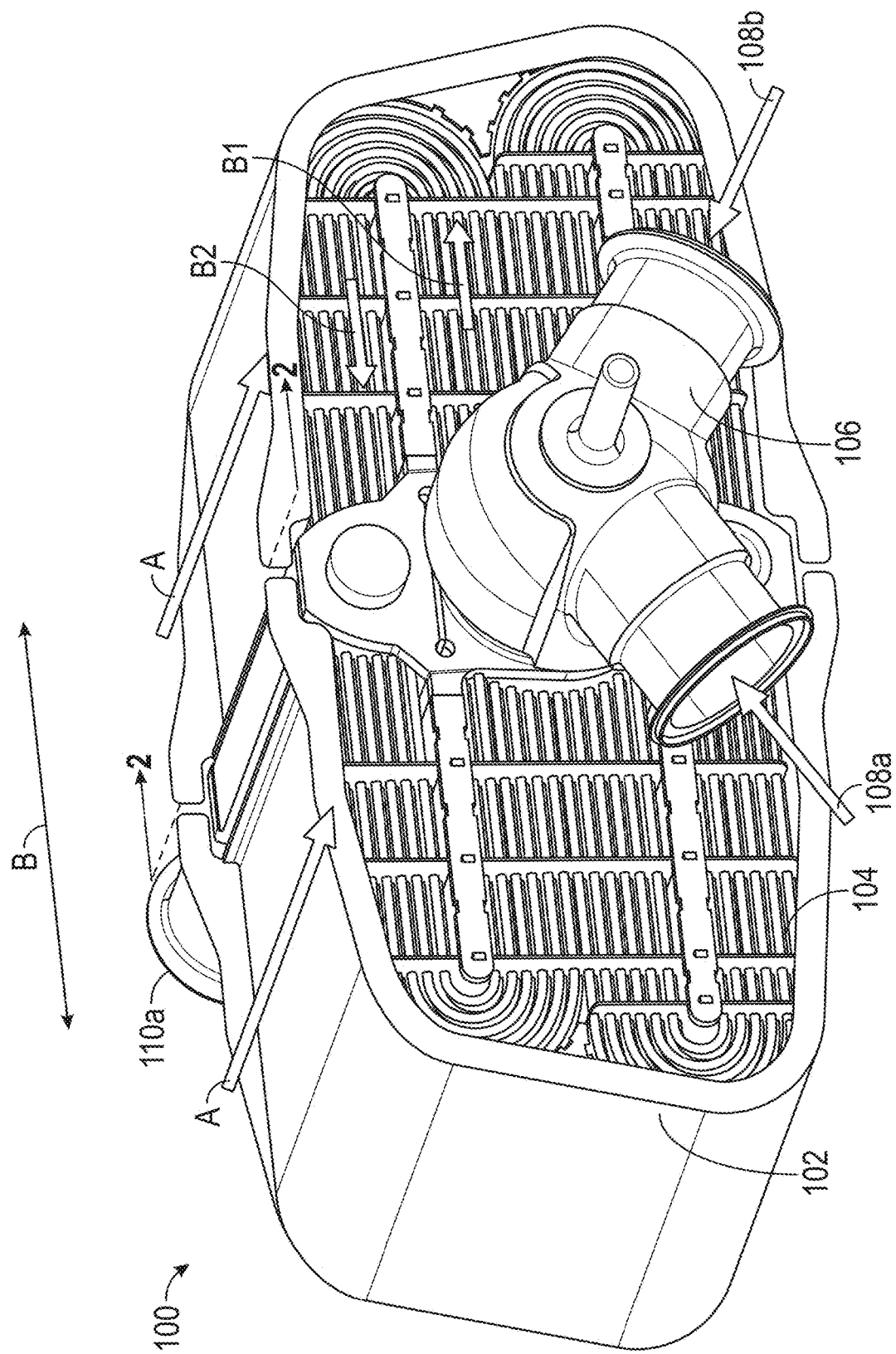
FIG. 1 is a heat sink according to an embodiment of the invention.

Referring now to FIG. 1, an example of heat sink 100 is illustrated. The heat sink 100 is a so-called "cross-flow" heat sink. To that end, cooling fluid flows in first direction shown by arrows A and the fluid to be cooled (e.g., hot fluid) flows generally in a direction perpendicular to arrows A. The direction perpendicular direction is shown by arrow B.

The heat sink 100 includes an outer housing 102. The outer housing 102 surrounds and protects heat exchange tubes 104.

In this example, a hot fluid enters the heat sink 100 through heat sink inlet 106. As illustrated, the inlet 106 includes two separate inlet ports 108a, 108b. The inlet 106 could have a single port or more than two ports depending on the context.

The fluid that enters ports 108a, 108b is provided into and flow though tubes 104. As the cooling fluid passes over and is in thermal contact with the tubes 104, heat from the fluid in the tubes 104 is transferred through the tube walls to the cooling fluid and removed. In that manner, fluid that exits the heat sink 100 via outlet 110 is cooler than fluid that enters it at inlet ports 108a, 108b.

Figure 2:
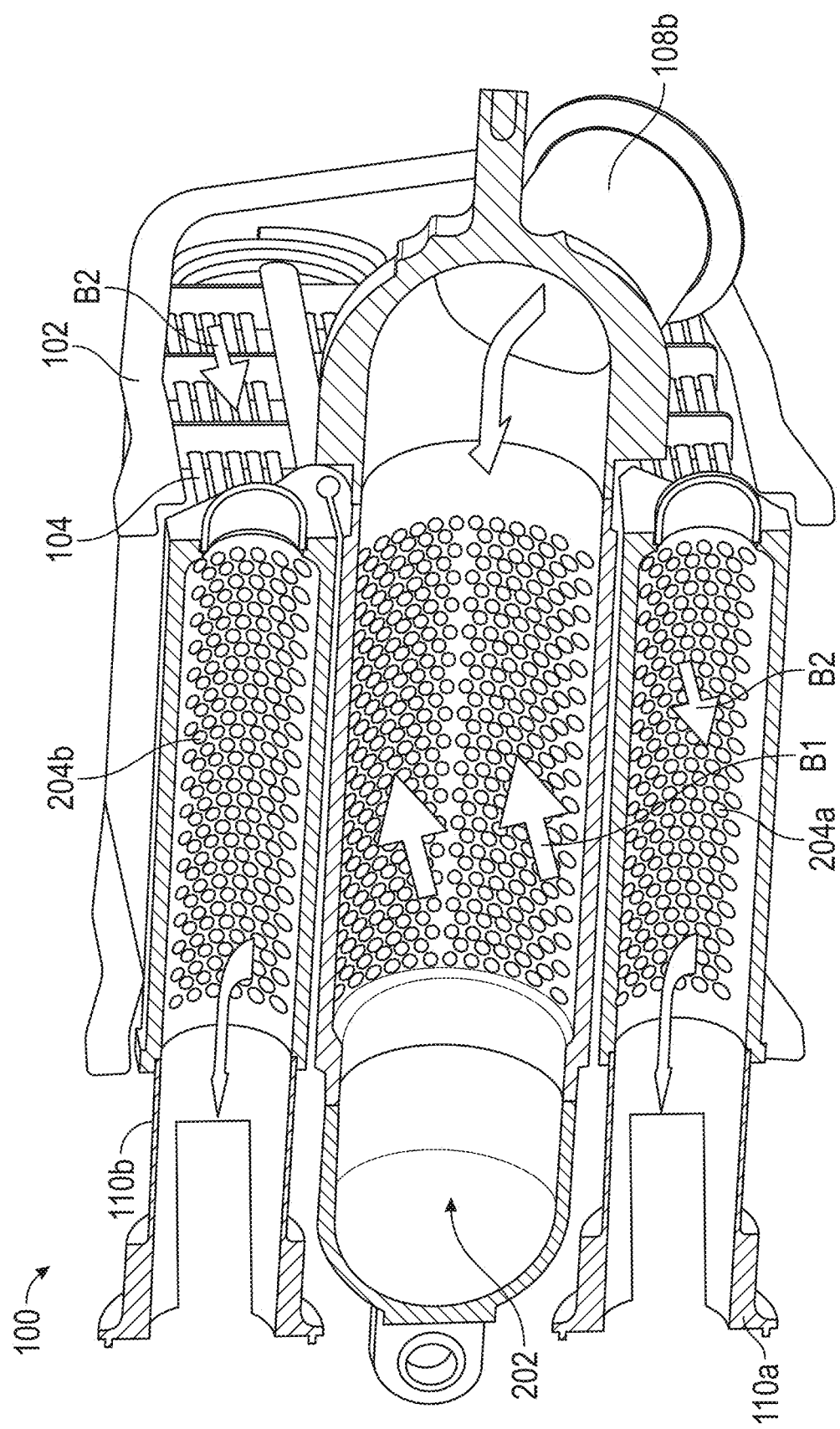
FIG. 2 is a cross-section of a heat sink according to an embodiment of the invention.

FIG. 2 shows a cross section of the heat sink 100 of FIG. 1 taken along line 2-2. With reference now to FIGS. 1 and 2, fluid enters inlet 106 and then travels outwardly from a central receiving reservoir 202. The hot fluid is directed into tubes 104 in direction B1. The hot fluid then turns around 180 degrees and travels back toward the central reservoir 202 in direction B2. The returning hot fluid has been cooled and then returns back into outer reservoirs 204a, 204b.

Figure 3:
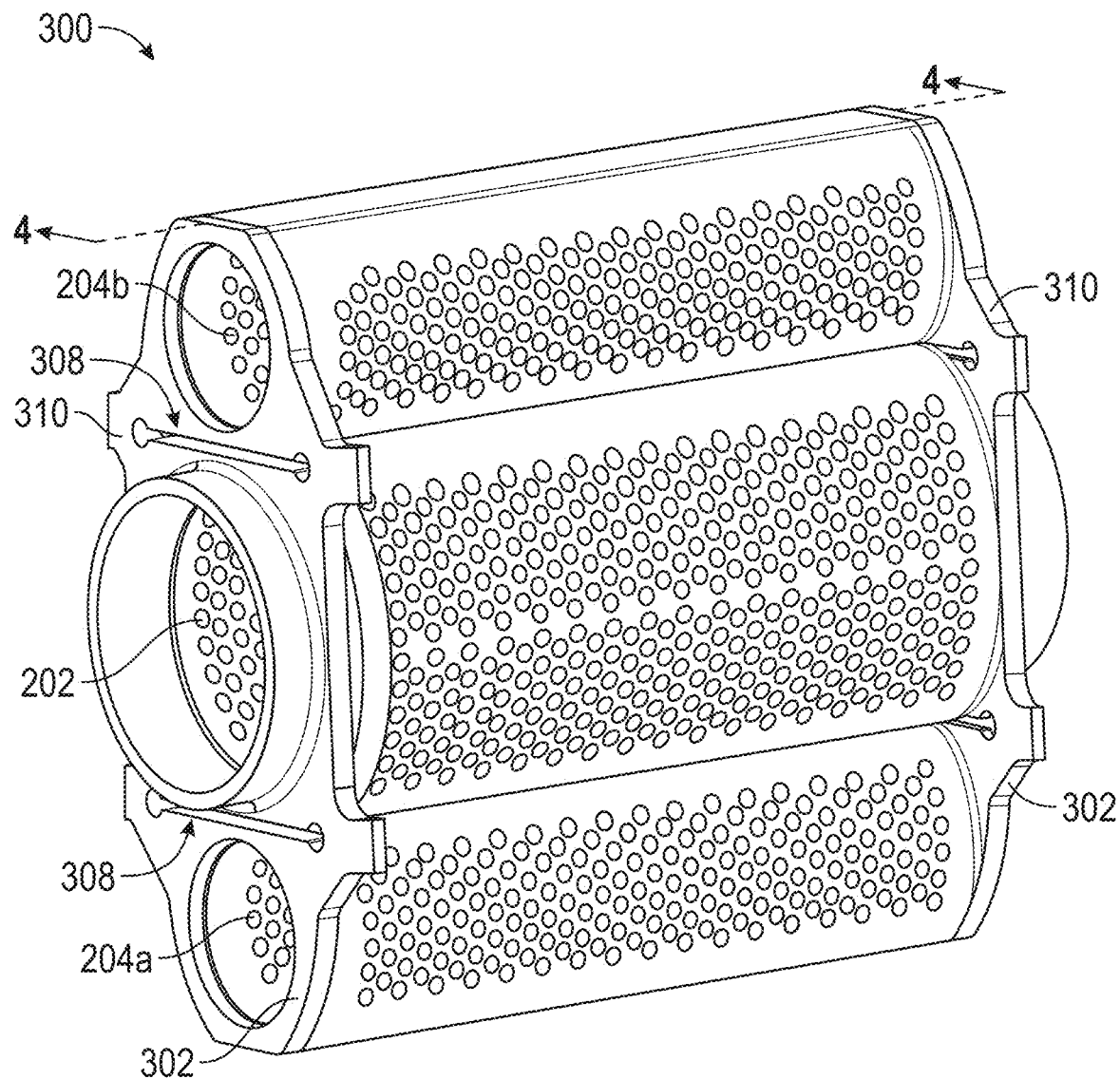
FIG. 3 is a perspective view of the manifold used in the heat sink.
Figure 4:
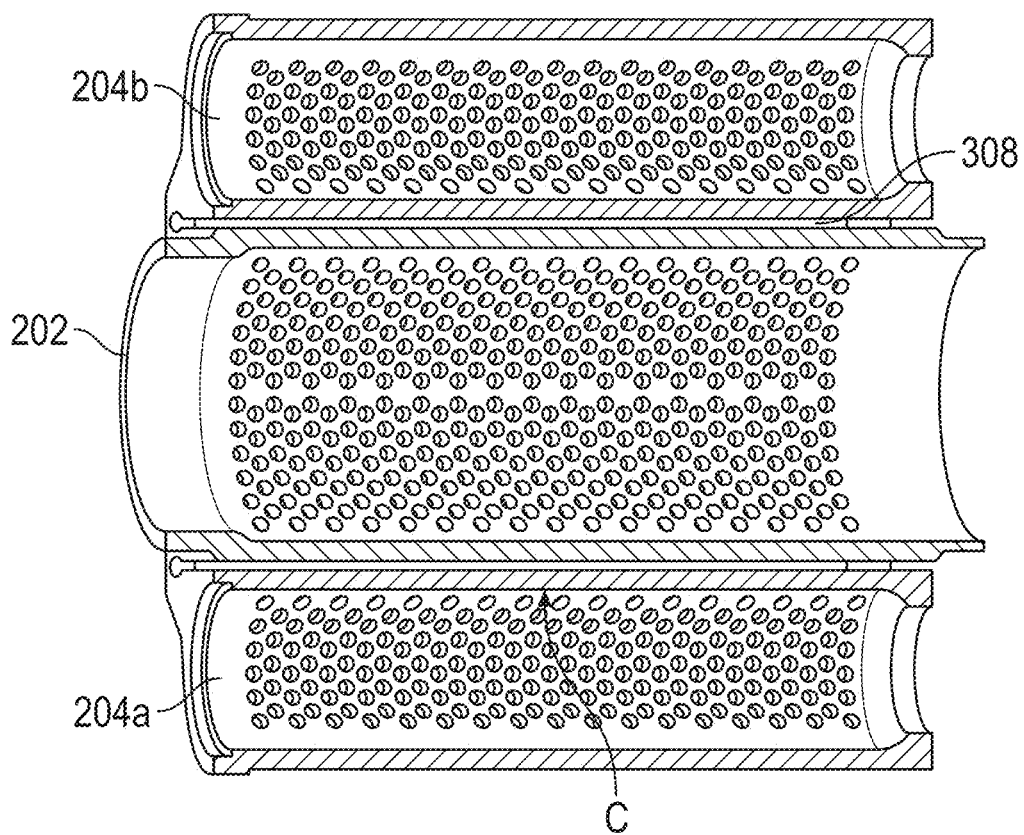
FIG. 4 is a cross section of the manifold of FIG. 3 according to one embodiment.

As configured, the central and outer reservoirs are formed as from a single piece of material generally referred to as a manifold. An example of such a manifold 300 is shown in FIGS. 3-4. Embodiments herein include a unitary manifold 300 having a central receiving reservoir 202 and one or more outer reservoirs 204 disposed about it. The manifold may be monolithic in one embodiment and formed from a single piece of material or by additive manufacturing.

The manifold 300 includes end caps 302 that hold the central receiving reservoir 202 and one or more outer reservoirs 204 in a fixed relationship to one another. In prior systems, an interface existed between the central receiving reservoir 202 and the one or more outer reservoirs 204 in a region shown by arrow C.

The hot fluid, as described above, enters the central receiving reservoir 202 at a temperature that is much higher that what is returned to the one or more outer reservoirs 204. Such differences in relative heats may cause significant thermal gradients between the inlet to outlet which drastically limit the service or useful life of the component. The limited life is the result of plastic strain which occurs in the material forming the manifold 300 due to the temperature gradients with every thermal cycle. Additionally, these devices require the inlet and outlet porting to be in close proximity to each other which typically leads to "thermal short circuiting". Thermal short circuiting is energy transfer directly from inlet to outlet bypassing the exchanging portion of the heat sink, essential reducing the overall effectiveness of the heat sink. That is, heat at the central receiving reservoir 202 may pass directly to the one or more outer reservoirs 204 though the material that forms the manifold 300.

Herein, the central receiving reservoir 202 and one or more outer reservoirs 204 are at least partially decoupled by forming a gap between them. The gap extends through almost all of the end caps 302 and along an entire or almost an entire length of the central receiving reservoir 202 and the one or more outer reservoirs 204. Such a gap is shown by element 308 in FIGS. 3-4. As illustrated, connection tabs 310 extending from the end caps 302 form the only thermal conduction path between the central receiving reservoir 202 and one or more outer reservoirs 204. The size and shape of such tabs may be selected to meet the required structural limits imposed on the manifold while keeping the above described issues minimal.

The manifold 300 may be formed in different manners. In a first manner, the manifold is formed as a monolithic element. Then the gap 308 may be machined from the manifold to thermally separate the central receiving reservoir 202 and the one or more outer reservoirs 204. In another manner, an additive manufacturing process may be employed to form the monolithic element with gap 308 separating the central receiving reservoir 202 and the one or more outer reservoirs 204.

Figure 5:
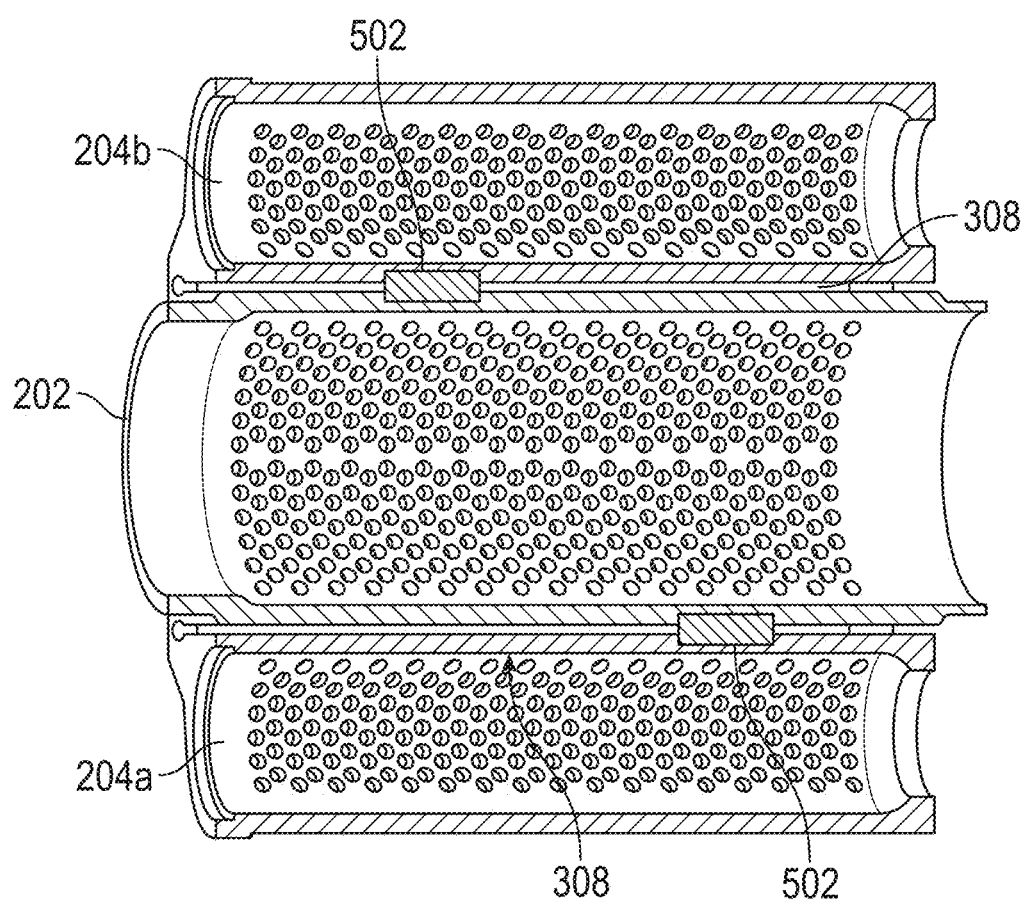
FIG. 5 is a cross section of the manifold of FIG. 3 according to another embodiment.

As illustrated, the gap 308 separates the central receiving reservoir 202 and the one or more outer reservoirs 204 along the entire length of the manifold 300 between the end caps 302. In another embodiment, one or more structural supports 500 could be provided in the gap 308 as shown in FIG. 5. Such element could be provided it needed but are not required.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A crossflow heat exchanger comprising:
    an outer housing;
    an inlet that receives a hot fluid to be cooled on a first side of the outer housing;
    a monolithic manifold that includes a central receiving reservoir that is coupled to the inlet and one or more outer reservoirs, wherein the hot fluid received at the inlet passes into the central receiving reservoir;
    tubes disposed within the outer housing that connect the central receiving reservoir and the one or more outer reservoirs;
    an outlet disposed on an opposite side of the outer housing, wherein the outlet is connected to the one or more outer reservoirs and removes cooled fluid from the heat exchanger;
    end caps disposed at opposing ends of the monolithic manifold; and
    wherein the monolithic manifold includes a gap formed between the central receiving reservoir and the one or more outer reservoirs and the gap provides for structural independence between the central receiving reservoir and the one or more outer reservoirs over a majority of a length of the monolithic manifold in all flow directions of the hot fluid.

2. The crossflow heat exchanger of claim 1, wherein the gap passes through the end caps.

3. The crossflow heat exchanger of claim 2, wherein the gap includes one or more supports disposed therein between the central receiving reservoir and the one or more outer reservoirs.

4. The crossflow heat exchanger of claim 1, wherein the inlet includes at least two inlet portions.

* * * * *